J. B. WATLING.
CASTER.
APPLICATION FILED SEPT. 27, 1919.
1,353,195.
Patented Sept. 21, 1920.
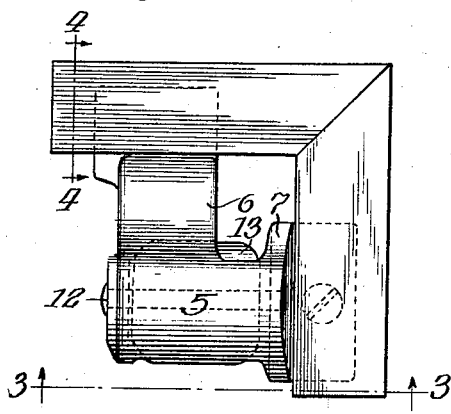
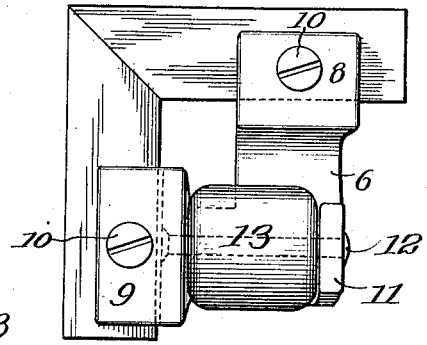
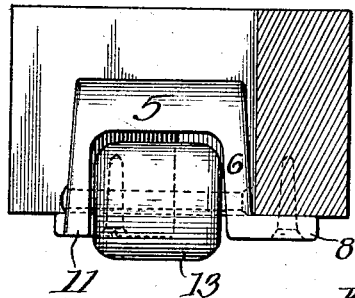
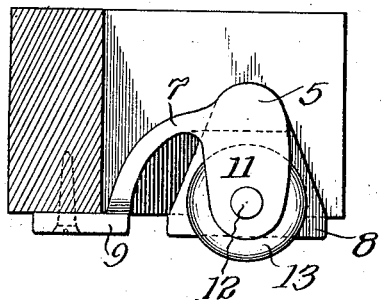
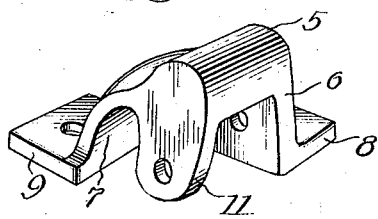
Inventor
John B. Watling

UNITED STATES PATENT OFFICE.

JOHN B. WATLING, OF CHICAGO, ILLINOIS.

CASTER.

1,353,195.     Specification of Letters Patent.     Patented Sept. 21, 1920.

Application filed September 27, 1919. Serial No. 326,971.

*To all whom it may concern:*

Be it known that I, JOHN B. WATLING, a citizen of the United States, and a resident of Chicago, county of Cook, and State of Illinois, have invented certain new and useful Improvements in Casters, of which I do declare the following to be a full, clear, and exact description, reference being had to the accompanying drawing, forming part hereof.

This invention has reference to that type of casters designed for supporting movable platforms, articles of furniture, or the like. The object of the invention is to provide a caster which is especially adapted to be placed at the corner of the article to be supported and which shall be of such construction that while strong and durable it can be produced at a very small cost. The invention consists in the features of novelty hereinafter described, illustrated in the accompanying drawing and particularly pointed out in the claim at the end of this specification.

Figure 1 is a plan view of a caster embodying my invention, this caster being shown as attached at the corner of the article to be supported; Fig. 2 is an inverted plan view; Fig. 3 is a view in vertical section on the line 3—3 of Fig. 1; Fig. 4 is a view in vertical section on the line 4—4 of Fig. 1. Fig. 5 is a detail perspective view of the caster frame, the roller being omitted.

My improved caster is formed preferably as a casting comprising a body portion 5 having depending members 6 and 7 formed integral therewith, these members 6 and 7 being provided at their lower ends with outwardly projecting lugs 8 and 9. The lugs 8 and 9 extend at right angles to each other and are furnished with holes through which will pass screws or bolts whereby the caster will be attached to the intersecting portions A and A' of the article to be supported. The caster is also formed with an integral yoke-arm 11 extending downwardly at the end opposite the member 6. The members 6 and 11 are provided with holes adapted to receive a pintle 12 that passes through the roller 13 of the caster. The body portion 5 of the caster extends over the roller from end to end and the several members 6, 7 and 11 have their walls inclined downwardly and outwardly so that the several parts of the caster may be formed as a single piece, the shape of the parts enabling them to be readily molded or stamped.

As shown, the member 7 of the caster is much narrower than the length of the body 5 and, hence a material saving of metal is effected and the manufacture of the caster simplified and cheapened.

My improved caster not only serves to effectively support the article to which it is connected at a slight distance above the floor, but, by providing the caster with depending members having attaching lugs at right angles to each other, the caster is especially adapted to be placed in the corners of the article to be supported.

Having thus described my invention, what I claim as new and desire to secure by Letters Patent is:—

A caster comprising the combination with a roller and its pintle, of an integral body having members extending across the ends of said roller, said members having holes to receive the ends of the pintle and each member having an attaching lug projecting laterally therefrom, said attaching lugs being arranged at right angles to each other.

JOHN B. WATLING.